(12) United States Patent
Nakamura et al.

(10) Patent No.: US 9,267,550 B2
(45) Date of Patent: Feb. 23, 2016

(54) TRANSMISSION SHIFT DEVICE (71) Applicant: Aisin Seiki Kabushiki Kaisha, Kariya-shi (JP)

(72) Inventors: Shinobu Nakamura, Toyoake (JP); Kyosuke Mori, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 72 days.

(21) Appl. No.: 14/169,440

(22) Filed: Jan. 31, 2014

(65) Prior Publication Data
US 2014/0238170 A1    Aug. 28, 2014

(30) Foreign Application Priority Data
Feb. 27, 2013 (JP) ................................. 2013-036521

(51) Int. Cl.
*F16D 11/00* (2006.01)
*F16D 23/06* (2006.01)

(52) U.S. Cl.
CPC .......... *F16D 11/00* (2013.01); *F16D 2011/002* (2013.01); *Y10T 74/19251* (2015.01)

(58) Field of Classification Search
CPC ................... F16D 2011/002; F16D 2011/006; F16D 2011/008; F16D 11/10; F16D 11/14; F16D 2023/0637; F16D 2023/0631; F16D 21/04; F16D 2306/12; F16D 23/12; F16D 23/06; F16D 11/00; F16D 23/025; F16H 3/083; F16H 61/0403

USPC ........... 74/325, 335, 336 R, 339; 192/53.342, 192/53.361, 69.7, 69.83, 53.363, 53.36
See application file for complete search history.

(56) References Cited

U.S. PATENT DOCUMENTS 2,179,568 A * 11/1939 White ...................... 192/53.342
2,470,208 A *  5/1949 Avila ......................... 192/53.36
(Continued)

FOREIGN PATENT DOCUMENTS

DE      102005056827  *  5/2007  ............. F16D 23/04
JP          9-177823        7/1997

*Primary Examiner* — Ha D Ho
*Assistant Examiner* — Jude Agendia
(74) *Attorney, Agent, or Firm* — Oblon, McClelland, Maier & Neustadt, L.L.P.

(57) ABSTRACT

A transmission shift device includes a rotary shaft rotationally connected to an input shaft of a transmission, first and second clutch rings rotationally connected to an output shaft of the transmission at a first gear ratio and a second gear ratio, respectively, a clutch hub fixed to the rotary shaft between the first clutch ring and the second clutch ring, a sleeve restricted a relative rotation with the clutch hub and movably engaged with the rotary shaft in the axial direction, first and second dog clutch portions projected from respective side surfaces of the first and second clutch rings and engageably and disengageably meshing with sleeve spline formed at the sleeve, and an elastic member positioned between the clutch hub and the sleeve and restricting a movement of the sleeve in the axial direction in each of a neutral state, a first shift state and a second shift state.

10 Claims, 9 Drawing Sheets

(56) References Cited

U.S. PATENT DOCUMENTS

| | | | | |
|---|---|---|---|---|
| 2,785,783 | A | * | 3/1957 | Homrig et al. ............ 192/114 R |
| 3,631,952 | A | * | 1/1972 | Sugimoto et al. ........ 192/53.342 |
| 3,872,737 | A | * | 3/1975 | Thomas .......................... 74/339 |
| 4,132,298 | A | * | 1/1979 | F'Geppert ................ 192/53.342 |
| 4,294,338 | A | * | 10/1981 | Simmons ........................ 74/339 |
| 4,566,568 | A | * | 1/1986 | Yant ........................ 192/53.341 |
| 4,660,707 | A | * | 4/1987 | Sadanori et al. ........... 192/53.34 |
| 4,750,597 | A | * | 6/1988 | Ikemoto et al. ............ 192/53.34 |
| 5,113,986 | A | * | 5/1992 | Frost ........................ 192/53.341 |
| 6,886,673 | B2 | * | 5/2005 | Burger ......................... 192/53.4 |
| 9,038,493 | B2 | * | 5/2015 | Iwasaki et al. .................. 74/335 |
| 2008/0302624 | A1 | * | 12/2008 | Steinz .................... F16D 23/06 192/53.341 |
| 2013/0240317 | A1 | | 9/2013 | Mori et al. |
| 2013/0240318 | A1 | | 9/2013 | Mori et al. |

* cited by examiner

TRANSMISSION SHIFT DEVICE

CROSS REFERENCE TO RELATED APPLICATIONS

This application is based on and claims priority under 35 U.S.C. §119 to Japanese Patent Application 2013-036521, filed on Feb. 27, 2013, the entire content of which is incorporated herein by reference.

TECHNICAL FIELD

This disclosure generally relates to a transmission shift device.

BACKGROUND DISCUSSION

A known transmission shift device for a vehicle is provided to change a shift stage. Such a shift device includes a holding mechanism holding a sleeve of a shift device in a neutral state and in each of the shift states of the shift stage. For example, as disclosed in JPH9-177823A (hereinafter referred to as Patent reference 1), a shift device shifts a sleeve meshed with a synchronizer hub fixed at a rotary shaft in an axial direction of the rotary shaft using, for example, a motor when changing a shift stage. At this time, by shifting the sleeve in the axial direction, the synchronizer ring is pressed by a leaf spring positioned between the sleeve and the synchronizer ring, and accordingly, presses against a clutch gear. Thus, respective rotary speeds of the sleeve, synchronizer ring and the clutch gear are gradually synchronized with one another. Then, an inner circumference of the sleeve is meshed with an outer circumference of the clutch gear to establish a desired shift state.

The leaf spring, as a holding mechanism holding the sleeve, includes one projection facing the sleeve and two projections facing the synchronizer ring. When the projection facing the sleeve engages with a center recessed portion of the sleeve, the center recessed portion of three recessed portions formed side-by-side in the axial direction at the inner circumferential surface of the sleeve, the sleeve is held in the neutral state. When the projection facing the sleeve engages with one of the recessed portions positioned at opposing ends in the axial direction of the three recessed portions, the sleeve is held in either of the shift states. Two projections projecting toward the synchronizer ring engage with respective recessed portions formed at the synchronizer ring. Thus, when the sleeve is held in the neutral state, the synchronizer ring is held to be close to the sleeve.

According to Patent reference 1, the leaf spring is fixed by engaging with cutouts of the synchronizer ring facing against the leaf spring. Thus, for example, the construction disclosed in Patent reference 1 cannot be applied to a shift device which includes a dog clutch without the synchronizer ring. Further, because the three recessed portions are formed side-by-side in the axial direction at the inner circumferential surface of the sleeve, the size of the shift device may be increased due to the long axial length. While the sleeve requires a strong holding force in the neutral state to increase the reliability, the holding force cannot be increased because the change of the position of the recessed portions engaged with the projections is the only operation to be done by the shift device when the shift device is shifted between the neutral state and the shift states.

A need thus exists for a transmission shift device which is not susceptible to the drawback mentioned above.

SUMMARY

According to an aspect of this disclosure, a transmission shift device includes a rotary shaft rotationally connected to an input shaft of a transmission and rotatably supported about an axis of the rotary shaft, a first clutch ring rotatably supported to the rotary shaft and rotationally connected to an output shaft of the transmission at a first gear ratio, a second clutch ring rotatably supported to the rotary shaft and rotationally connected to the output shaft of the transmission at a second gear ratio, a clutch hub being fixed to the rotary shaft between the first clutch ring and the second clutch ring, a sleeve being restricted a relative rotation with the clutch hub and movably engaged with the rotary shaft in the axial direction, a first dog clutch portion being projected from a side surface of the first clutch ring to face the sleeve and engageably and disengageably meshing with a sleeve spline formed at the sleeve in response to a shaft drive of the sleeve, a second dog clutch portion being projected from a side surface of the second clutch ring to face the sleeve and engageably and disengageably meshing with the sleeve spline formed at the sleeve in response to the shaft drive of the sleeve, a shaft drive device moving the sleeve in the axial direction, and an elastic member being positioned between the clutch hub and the sleeve and restricting a movement of the sleeve in the axial direction in each of a neutral state where the sleeve spline does not mesh with the first dog clutch portion and the second dog clutch portion, of a first shift state where the sleeve spline meshes with the first dog clutch portion, and of a second shift state where the sleeve spline meshes with the second dog clutch portion. The elastic member includes a first engaging portion and a second engaging portion and is fixed at one of an inner circumferential surface of the sleeve and an outer circumferential surface of the clutch hub, and a first engaged portion and a second engaged portion are provided at the other one of the inner circumferential surface of the sleeve and the outer circumferential surface of the clutch hub. The first engaging portion engages with the first engaged portion while the second engaging portion engages with the second engaged portion in the neutral state. The first engaging portion engages with the second engaged portion in the first shift state. The second engaging portion engages with the first engaged portion in the second shift state.

According to another aspect of this disclosure, a transmission shift device includes a rotary shaft rotationally connected to an output shaft of a transmission and rotatably supported about an axis of the rotary shaft, a first clutch ring rotatably supported to the rotary shaft and rotationally connected to an input shaft of the transmission at a first gear ratio, a second clutch ring rotatably supported to the rotary shaft and rotationally connected to the input shaft of the transmission at a second gear ratio, a clutch hub being fixed to the rotary shaft between the first clutch ring and the second clutch ring, a sleeve being restricted a relative rotation with the clutch hub and movably engaged with the rotary shaft in the axial direction, a first dog clutch portion being projected from a side surface of the first clutch ring to face the sleeve and engageably and disengageably meshing with a sleeve spline formed at the sleeve in response to a shaft drive of the sleeve, a second dog clutch portion being projected from a side surface of the second clutch ring to face the sleeve and engageably and disengageably meshing with the sleeve spline formed at the sleeve in response to the shaft drive of the sleeve, a shaft drive device moving the sleeve in the axial direction, and an elastic member being positioned between the clutch hub and the sleeve and restricting a movement of the sleeve in the axial direction in each of a neutral state where the sleeve spline does not mesh with the first dog clutch portion and the second dog clutch portion, of a first shift state where the sleeve spline meshes with the first dog clutch portion, and of a second shift state where the sleeve spline meshes with the second dog clutch portion. The elastic member includes a first engaging portion and a second engaging portion and is fixed at one of an inner circumferential surface of the sleeve and an outer circumferential surface of the clutch hub, and a first engaged portion and a second engaged portion are provided at the other one of the inner circumferential surface of the sleeve and the outer circumferential surface of the clutch hub. The first engaging portion engages with the first engaged portion while the second engaging portion engages with the second engaged portion in the neutral state. The first engaging portion engages with the second engaged portion in the first shift state. The second engaging portion engages with the first engaged portion in the second shift state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
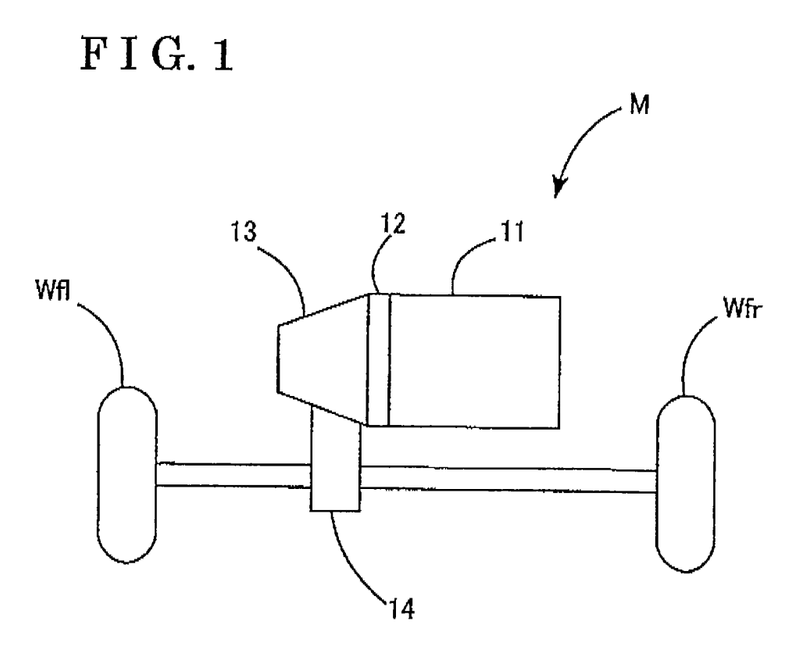
FIG. 1 is a schematic view of a partial configuration of a vehicle applying a transmission shift device of the disclosure.

Embodiments in which an automatic transmission including a shift device with dog clutches is mounted to a vehicle will be explained with reference to the attached drawings. As illustrated in FIG. 1, a vehicle M includes an engine 11, a clutch 12, an automatic transmission 13 serving as a transmission, a differential gear device 14 and driving wheels, that is, front-left and front-right wheels Wfl and Wfr. The engine 11 generates a driving force by combustion of fuel. The driving force of the engine 11 is transmitted to the driving wheels Wfl and Wfr via the clutch 12, the automatic transmission 13, and the differential gear device 14. That is, the vehicle M is a front-engine, front-drive vehicle. However, the front-engine, front-drive vehicle is one of the examples of the vehicle M and is not limited to this. For example, the vehicle M may be a front-wheel drive vehicle or a four-wheel drive vehicle.

Figure 2:
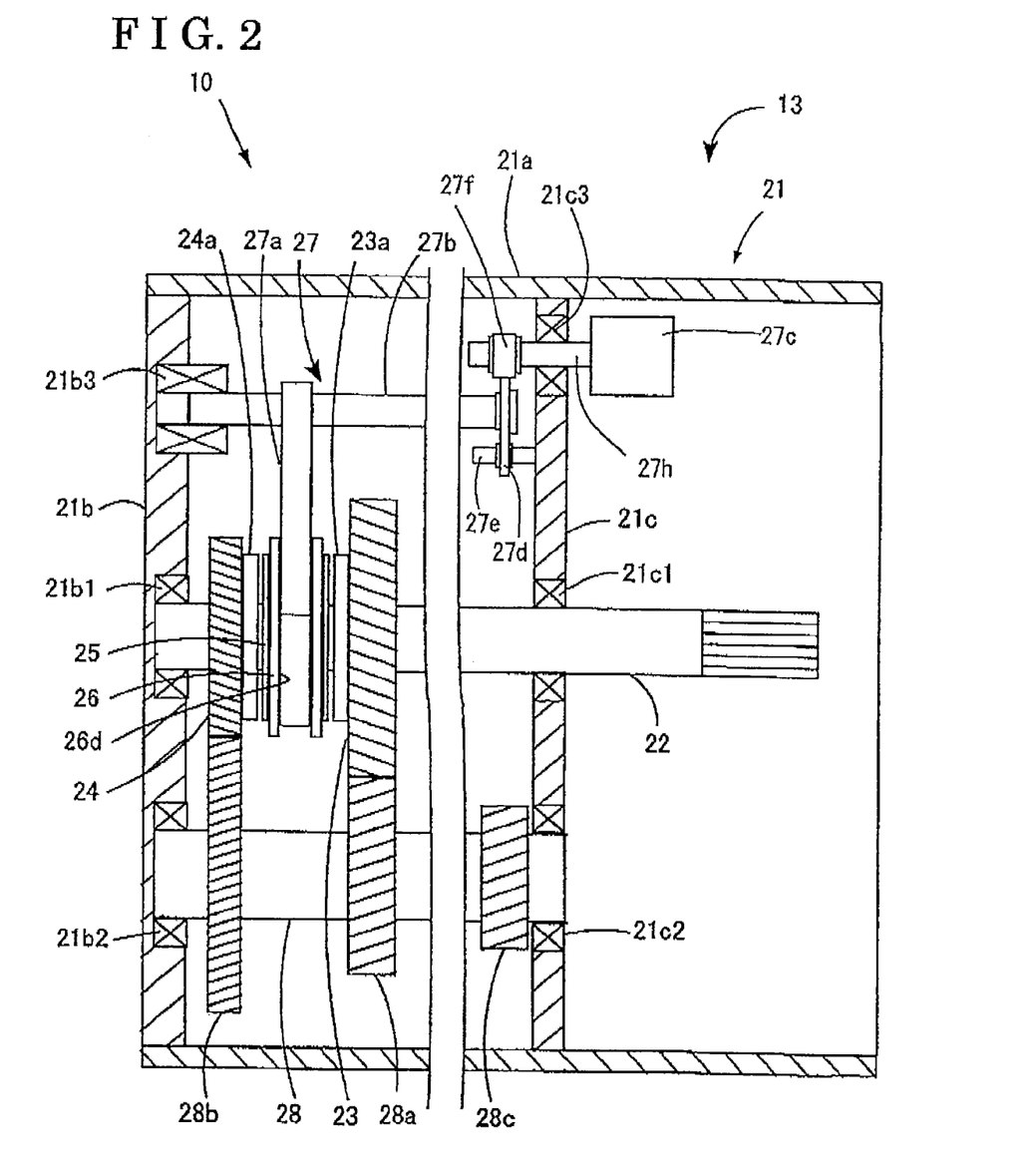
FIG. 2 is an explanatory view of an automatic transmission including the transmission shift device of the disclosure.

The clutch 12 is automatically connected and disconnected in accordance with a command by a control unit. As illustrated in FIG. 2, the automatic transmission 13 includes a shift device 10 provided with a dog clutch mechanism for automatically selecting, for example, between five forward speeds and one reverse speed. For an explanatory purpose, FIG. 2 illustrates the shift stage with two forward speeds only. The differential gear device 14 illustrated in FIG. 1 includes both a final gear and a differential gear and is integrally formed with the automatic transmission 13.

As illustrated in FIG. 2, the automatic transmission 13 includes a casing 21, an input shaft 22, an output shaft 28 and the shift device 10.

The casing 21 includes a bottomed, substantially cylindrical-shape body portion 21a, a first wall portion 21b which is a bottom wall portion of the body portion 21a, and a second wall portion 21c dividing an inside of the body portion 21a in a right-left direction in FIG. 2 to form a left portion and a right portion of the body portion 21a.

The input shaft 22 is rotatably supported by the casing 21. Specifically, a first end (a left end in FIG. 2) of the input shaft 22 is axially supported by the first wall portion 21b via a first bearing 21b1 while a second end (a right end in FIG. 2) of the input shaft 22 is axially supported by the second wall portion 21c via a second bearing 21c1. The second end of the input shaft 22 is rotationally connected to an output shaft of the engine 11 via the clutch 12 (see FIG. 1). Accordingly, an output of the engine 11 is input to the input shaft 22 when the clutch 12 is connected. When the clutch 12 is disconnected, the input shaft 22 is in a freely rotatable state.

The output shaft 28 is rotatably supported by the casing 21. Specifically, a first end (a left end in FIG. 2) of the output shaft 28 is axially supported by the first wall portion 21b via a third bearing 21b2 while a second end (a right end in FIG. 2) of the output shaft 28 is axially supported by the second wall portion 21c via a fourth bearing 21c2. A first output gear 28a, a second output gear 28b, and a third output gear 28c are fixed to the output shaft 28 by, for example, spline fitting, A gear, specifically, a helical gear, is formed at an outer circumferential surface of the first output gear 28a to engage with a first clutch ring 23. A gear, specifically, a helical gear, is formed at an outer circumferential surface of the second output gear 28b to engage with a second clutch ring 24.

A gear, specifically, a helical gear, is formed at an outer circumferential surface of the third output gear 28c to engage with a clutch ring of the differential gear device 14. As such, the output shaft 28 is rotationally connected to the driving wheels Wfl and Wfr via the differential gear device 14.

Accordingly, the rotations of the driving wheels Wfl and Wfr forcibly rotate the first clutch ring 23 and the second clutch ring 24 via the differential gear device 14, the third output gear 28c, the output shaft 28, the first output gear 28a, and the second output gear 28b.

Thus, when the connectable and disconnectable clutch 12 is connected, the driving force applied by the engine 11 is input from the input shaft 22, transmitted to the output shaft 28, and finally, output to the driving wheels Wfl and Wfr via the third output gear 28c and the differential gear device 14.

Figure 3:
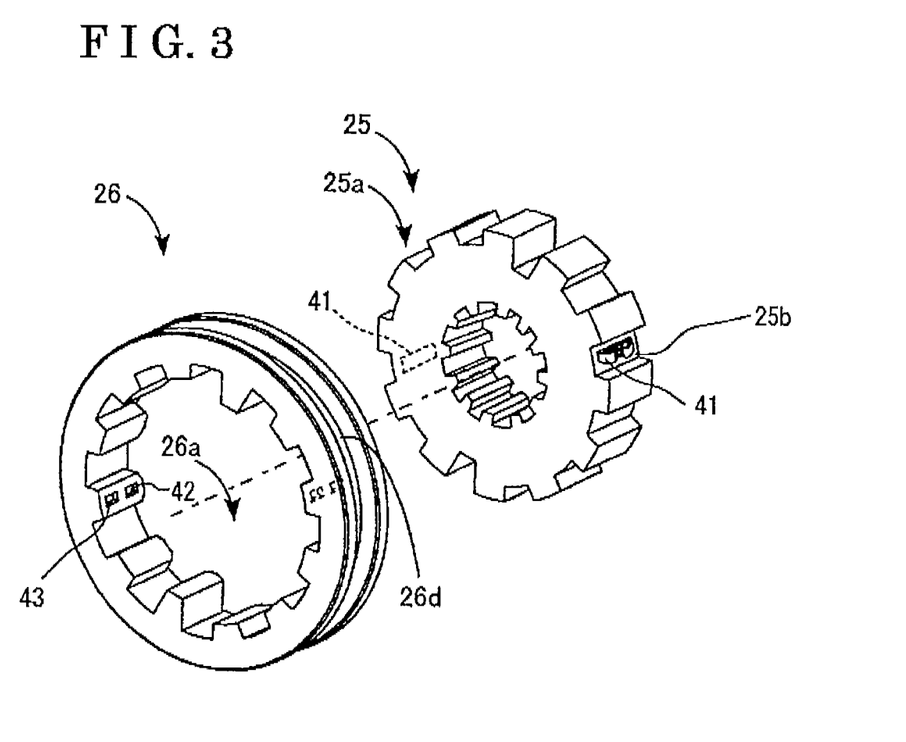
FIG. 3 is a perspective view illustrating a configuration of a sleeve and a clutch hub.
Figure 4:
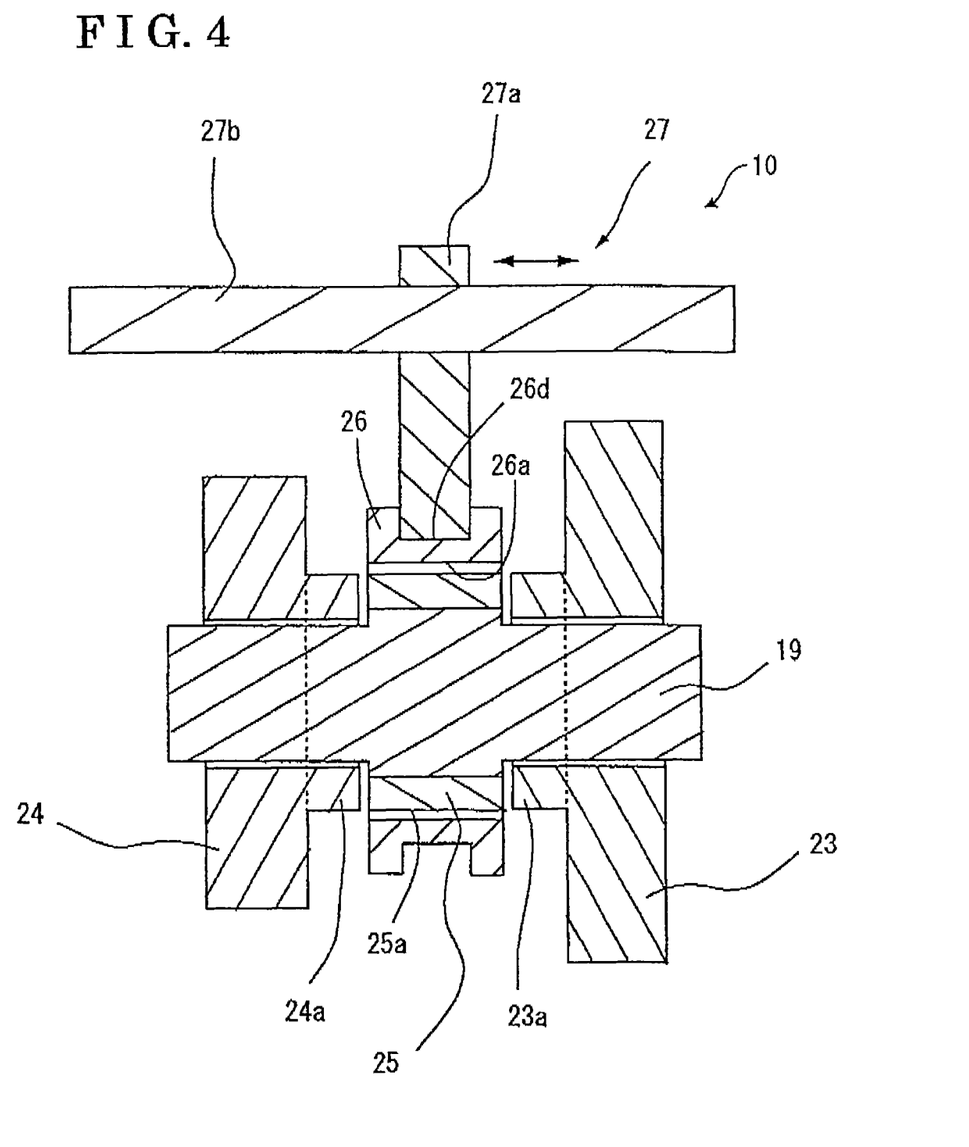
FIG. 4 is a cross sectional view of the shift device illustrated in FIG. 2.

Next, the structure of the shift device 10 will be explained. As illustrated in FIGS. 2 to 4, the shift device 10 includes a rotary shaft 19, the first and second clutch rings 23 and 24, a clutch hub 25, a sleeve 26, an shaft drive device 27 and a holding mechanism holding the sleeve 26 in a neutral state N, a first shift state S1 and a second shift state S2. As illustrated in FIG. 3, the holding mechanism includes the sleeve 26, the clutch hub 25 and an elastic member 41.

The rotary shaft 19 is rotationally connected to the input shaft 22 of the automatic transmission 13 and rotatably supported about an axis of the rotary shaft 19 (hereinafter, referred to as axis) with the input shaft 22.

The first and second clutch rings 23 and 24 are freely rotatably supported by the rotary shaft 19. As illustrated in FIGS. 2 and 4, the respective first and second clutch rings 23 and 24 are positioned opposite sides of the clutch hub 25 to be adjacent to the clutch hub 25. A gear, specifically, a helical gear, is formed at an outer circumferential surface of the first clutch ring 23 to mesh with the first output gear 28a fixed on the output shaft 28. The first clutch ring 23 is meshed with the first output gear 28a to establish the first shift stage for operating in the first gear ratio.

A gear, specifically, a helical gear, is formed is formed at an outer circumferential surface of the second clutch ring 24 to mesh with the second output gear 28b fixed on the output shaft 28. The second clutch ring 24 is meshed with the second output gear 28b to establish the second shift stage for operating in the second gear ratio. According to a first embodiment, the first gear ratio is greater than the second gear ratio. As such, the first and second clutch rings 23 and 24 are rotationally connected to the output shaft 28.

As illustrated in FIGS. 2 and 4, a first dog clutch portion 23a is formed at a side surface of the first clutch ring 23 so as to face the clutch hub 25. The first dog clutch portion 23a is for engaging with a spline 26a formed at the sleeve 26. A second dog clutch portion 24a is formed at a side surface of the second clutch ring 24 so as to face the clutch hub 25. The second dog clutch portion 24a is for engaging with the spline 26a formed at the sleeve 26.

Because the teeth of first and the second dog clutch portions 23a and 24a are formed by a known method for forming a dog clutch, specific explanations will not be described.

The clutch hub 25 is fixed on the rotary shaft 19 by spline fitting so as to be integrally rotatable about the axis. As illustrated in FIG. 3, a spline 25a is formed at an outer circumferential surface of the clutch hub 25 while a spline 26a serving as a sleeve spline is formed at an inner circumferential surface of the sleeve 26. The spline 25a is engaged with the spline 26a in a slidable manner in an axial direction of the input shaft 22 (hereinafter, referred to as axial direction) while restricting relative rotation with the spline 26a.

The shaft drive device 27 drives the sleeve 26 to reciprocate in the axial direction. The shaft drive device 27 allows the sleeve 26 to move in response to a reaction force that is applied from the first clutch ring 23 when the sleeve 26 is pressed against the first clutch ring 23. The shaft drive device 27 allows the sleeve 26 to move in response to the reaction force that is applied from the second clutch ring 24 when the sleeve 26 is pressed against the second clutch ring 24.

The shaft drive device 27 includes a fork 27a, a fork shaft 27b, and an actuator 27c. According to the first embodiment, the actuator 27c is a rotational driving motor in which an output shaft of the rotational driving motor is rotated. An end portion of the fork 27a is formed to conform to an outer circumferential shape of the outer circumferential groove 26d of the sleeve 26. A base portion of the fork 27a is fixed to the fork shaft 27b. The fork shaft 27b is supported by the casing 21 so as to be slidable in the axial direction. That is, a first end (a left end in FIG. 2) of the fork shaft 27b is supported by the first wall portion 21b via a fifth bearing 21b3 while a second end (a right end in FIG. 2) of the fork shaft 27b is fixed to a bracket 27d. The bracket 27d is slidable by a guide member 27e projecting in the axial direction from a second wall portion 21c and fixed by a nut member 27f. The nut member 27f is screwed to a driving shaft 27h rotationally connected to the actuator 27c so as to freely move forward and backward. The driving shaft 27h is supported by the second wall portion 21c via a sixth bearing 21c3.

A control unit controls an energizing amount supplying to the actuator 27c to rotate a rotary shaft of the actuator 27c, resulting in that the driving shaft 27h connected to the rotary shaft of the actuator 27c rotates at an predetermined rotational speed. Accordingly, the nut member 27f, the bracket 27d and the fork shaft 27b reciprocate in the axial direction to be fixed at predetermined positions. Further, the information of the fixed position of the fork shaft 27b predeterminedly located is constantly obtained by a stroke sensor that operates a feedback control.

Any types of actuators other than a rotary drive motor may be applied to the actuator 27c. For example, a linear motor disclosed in JP2008-259413A may be applied. Further, in a manual transmission vehicle, the fork shaft 27b may be manually moved in the axial direction by a driver without using an actuator.

Next, the holding mechanism of the sleeve 26 will be explained. As illustrated in FIG. 3, the holding mechanism includes the sleeve 26, the clutch hub 25 and the elastic member 41. The holding mechanism is positioned between the sleeve 26 and the clutch hub 25. According to the first embodiment, as illustrated in FIG. 3, the holding mechanism is formed at predetermined two positions spaced apart from one another approximately 180 degrees on circumferences of the sleeve 26 and the clutch hub 25.

Figure 5:
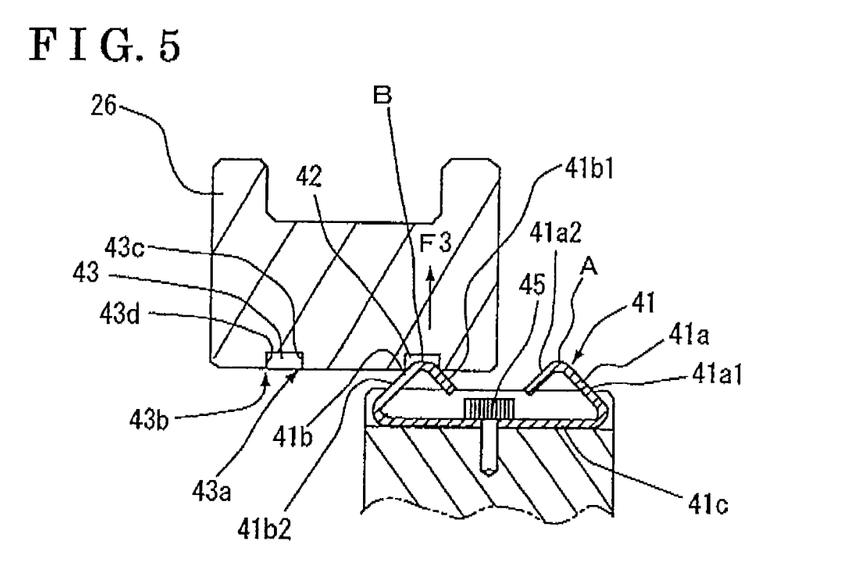
FIG. 5 is a cross sectional view of a sleeve holding mechanism in a second shift state according to a first embodiment.
Figure 6:
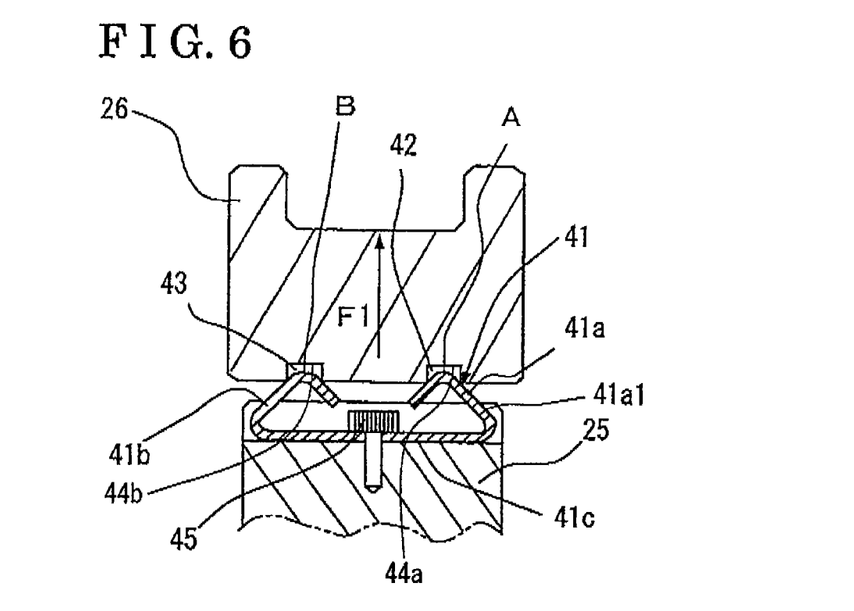
FIG. 6 is a cross sectional view of the sleeve holding mechanism in a neutral state according to the first embodiment.
Figure 7:
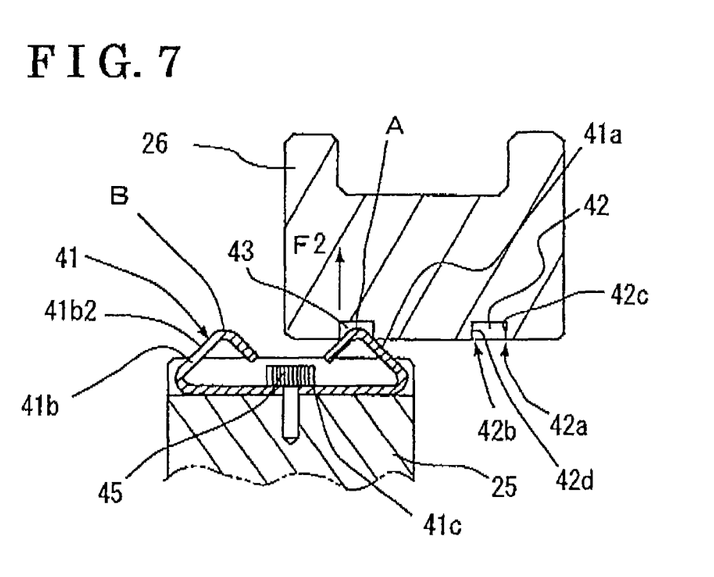
FIG. 7 is a cross sectional view of the sleeve holding mechanism in a first shift state according to the first embodiment.

As illustrated in cross sectional views of FIGS. 5 to 7, the elastic member 41 is positioned between the clutch hub 25 and the sleeve 26. The elastic member 41 includes a first projection 41a serving as a first engaging portion and a second projection 41b serving as a second engaging portion, and a base portion 41c. The elastic member 41 formed by a rectangular plate member is formed by folding each of opposing ends of the base portion 41c twice in the same direction. Accordingly, the first and second projections 41a and 41b are formed in the same size. Each bending portion is formed in a round shape.

As illustrated in FIGS. 6 to 7, the first and second projections 41a and 41b are formed in a substantially triangle shape in a view from a plate thickness direction of the elastic member 41. Having the substantially triangle shape, first and second peaks A and B of the triangles of the first and second projections 41a and 41b are pressed in a radially outward direction of the clutch hub 25 to deflect the first and second projections 41a and 41b. Accordingly, upward biasing forces F2 and F3 are generated as reaction forces. The biasing forces F2 and F3 bias the sleeve 26 in the radially outward direction and stably hold the sleeve 26. The elastic member 41 may be made of any materials as long as the material provides the biasing force required. The required biases force can be freely set.

The base portion 41c, positioned between the two portions, the first and second projections 41a and 41b, is fixed to the outer circumferential surface, serving as one of the inner circumferential surface of the sleeve 26 and the outer circumferential surface of the clutch hub 25, of the clutch hub 25 by a bolt 45 screwed to the outer circumferential surface of the clutch hub 25. The elastic member 41 is fixed at two positions which are, as illustrated in FIG. 3, a flat surface portion 25b positioned at a bottom portion of the spline 25a of the clutch hub 25, and a flat surface portion positioned at the bottom portion of the spline 25a, the flat surface portion spaced apart from the flat surface portion 25b approximately 180 degrees in the circumferential direction of the clutch hub 25. However, the position, or attitude of the elastic member 41 to be mounted is not limited to this. The elastic member 41 can be mounted at any positions as long as no interference is caused when the sleeve 26 engages with each of the dog clutch portions. For example, the elastic member 41 may be mounted at a flat surface portion which is formed by processing a top portion of the spline 25a.

Next, first recessed portion 42 for engagement serving as a first engaged portion and the second recessed portion 43 for engagement serving as a second engaged portion engaging with the two respective portions, the first and second projections 41a and 41b, will be explained. As illustrated in FIG. 3, the first and second recessed portions 42 and 43 for engagement are spaced apart from one another in the axial direction at the inner circumferential surface, serving as the other one of the inner circumferential surface of the sleeve 26 and the outer circumferential surface of the clutch hub 25, of the sleeve 26 so as to face the elastic member 41 fixed at the circumferential surface of the clutch hub 25. As illustrated in FIGS. 5 to 7, the first recessed portion 42 for engagement is a recess formed and recessed and includes first and second facing surfaces 42c and 42d positioned orthogonal to the axial direction and facing one another to be recessed. The second recessed portion 43 for engagement is the recess formed and recessed and includes third and fourth facing surfaces 43c and 43d positioned orthogonal to the axial direction and facing one another. As illustrated in FIGS. 5 to 7, first and second corner portions 42a and 42b are the corner portions positioned at an outlet opening of the first and second facing surfaces 42c and 42d while third and fourth corner portions 43a and 43b are the corner portions positioned at an outlet opening of the third and fourth facing surfaces 43c and 43d. The first projection 41a of the elastic member 41 is sandwiched by, and engaged with the first and second facing surfaces 42c and 42d of the first recessed portion 42 for engagement while the second projection 41b of the elastic member 41 is sandwiched by, and engaged with the third and fourth facing surfaces 43c and 43d of the second recessed portion 43 for engagement. The first projection 41a of the elastic member 41 comes into contact with and engages with the first and second corner portions 42a and 42b of the first recessed portion 42 for engagement as well as the third and fourth corner portions 43a and 43b of the second recessed portion 43 for engagement. The second projection 41b of the elastic member 41 comes into contact with and engages with the first and second corner portions 42a and 42b of the first recessed portion 42 for engagement as well as the third and fourth corner portions 43a and 43b of the second recessed portion 43 for engagement.

The top portion of the spline 26a is formed at the inner circumferential surface of the sleeve 26 facing the elastic member 41. Alternatively, the top portion of the spline 26a can be processed so as to be matched with the height of the first and second projections 41a and 41b of the elastic member 41. In a position where the relative position of the clutch hub 25 and the sleeve 26 is the neutral state N, the first and second recessed portions 42 and 43 for engagement may be positioned such that the relative positions of the elastic member 41 and the first and second recessed portions 42 and 43 for engagement are as illustrated in FIG. 6. That is, in the neutral state N, the first and second recessed portions 42 and 43 for engagement may be positioned such that the first engaging portion engages with the first engaged portion while the second engaging portion engages with the second engaged portion.

Specifically, as illustrated in FIG. 6, the first and second projections 41a and 41b are engaged into the first and second recessed portions 42 and 43 for engagement, respectively. That is, the first and second corner portions 42a and 42b of the first recessed portion 42 for engagement comes into contact with first and second straight line portions 41a1 and 41a2 of the first projection 41a, respectively, while the third and fourth corner portions 43a and 43b of the second recessed portion 43 for engagement comes into contact with third and fourth straight line portions 41b1 and 41b2 of the second projection 41b, respectively, to position the sleeve 26 in the neutral state N. Alternatively, the first and second corner portions 42a and 42b of the first recessed portion 42 for engagement as well as the third and fourth corner portions 43a and 43b of the second recessed portion 43 for engagement may come into contact with the round portions near the respective first and second peaks A and B of the first and second projections 41a and 41b. At this time, the first peak A of the first projection 41a does not come into contact with a first bottom surface 44a of the first recessed portion 42 for engagement while the second peak B of the second projection 41b does not come into contact with a second bottom surface 44b of the second recessed portion 43 for engagement.

Next, the relative positions of the clutch hub 25 and the sleeve 26 in the first shift state S1 and second shift state S2 will be explained. As illustrated in FIG. 7, the first shift state S1 is a state where the sleeve 26 moves to right from the position, or attitude of the sleeve 26 in FIG. 6 to mesh the spline 26a of the sleeve 26 with the first dog clutch portion 23a to establish the first shift stage for operating in the first gear ratio. As illustrated in FIG. 5, the second shift state S2 is a state where the sleeve 26 moves to left from the position, or attitude of the sleeve 26 in FIG. 6 to mesh the spline 26a of the sleeve 26 with the second dog clutch portion 24a to establish the second shift stage for operating in the second gear ratio. According to the first embodiment, the second shift stage (the second shift state S2) has a smaller gear ratio than the first shift stage (the first shift state S1). Any combination of the gear ratios may be applied including the first shift stage for operating in the first gear ratio and the second shift stage for operating in the second gear ratio.

As described above, in a state where the position, or attitude of the sleeve 26 is in the first shift state S1, the relative positions of the first and second projections 41a and 41b of the elastic member 41 and the first and second recessed portions 42 and 43 for engagement, respectively, are as illustrated in FIG. 7. In a state where the position, or attitude of the sleeve 26 is in the second shift state S2, the relative positions of the first and second projections 41a and 41b of the elastic member 41 and the first and second recessed portions 42 and 43 for engagement, respectively, are as illustrated in FIG. 5. Accordingly, the distance between the first recessed portion 42 for engagement and the second recessed portion 43 for engagement spaced apart from one another in the axial direction shall be the distance required to move the sleeve 26 in the axial direction from the neutral state N to establish the first shift stage operating in the first gear ratio and the second shift stage operating in the second gear ratio.

As illustrated in FIG. 7, in the first shift state S1, the first projection 41a is engaged into the second recessed portion 43 for engagement positioned left of the sleeve 26. The sleeve 26 is positioned such that the third and fourth corner portions 43a and 43b of the second recessed portion 43 for engagement are in contact with the first and second straight line portions 41a1 and 41a2 of the first projection 41a, respectively. Thus, the sleeve 26 is restricted from moving in the axial direction favorably. At this time, the biasing force F2 applied by the first projection 41a and biasing against the sleeve 26 in a radially outward direction is substantially a half of the biasing force F1 applied by the first and second projections 41a and 41b and biasing against the sleeve 26 in the radially outward direction in response to the number of the projections biasing the sleeve 26.

As illustrated in FIG. 5, in the second shift state S2, the second projection 41b is engaged into the first recessed portion 42 for engagement positioned the right of the sleeve 26. The sleeve 26 is positioned such that the first and second corner portions 42a and 42b of the first recessed portion 42 for engagement are in contact with the third and fourth straight line portions 41b1 and 41b2 of the second projection 41b, respectively. Thus, the sleeve 26 is restricted from moving in the axial direction favorably. At this time, the biasing force F3 applied by the second projection 41b and biasing against the sleeve 26 in the radially outward direction is the same as the biasing force F2, and substantially a half of the biasing force F1 applied by the first and second projections 41a and 41b and biasing against the sleeve 26 in the radially outward direction.

Next, the operation of the shift device 10 will be explained. The following explains how the shift device 10 is shifted from the second shift state S2 to a gear stage with a greater gear ratio, that is, the first shift state S1, the shift stage established by the first clutch ring 23 and the first output gear 28a.

The holding mechanism of the shift device 10 in the second shift state S2 is positioned as illustrated in FIG. 5. The control unit controls the clutch 12 to be disconnected to change the gear stage. Then, the control unit controls the shaft drive device 27 to move the fork shaft 27b in the axial direction toward the first clutch ring 23.

Accordingly, the second projection 41b of the holding mechanism is disconnected from the second recessed portion 42 for engagement while being deflected toward the clutch hub 25. Then, the second peak B of the second projection 41b slides on the inner circumferential surface of the sleeve 26 to engage the second projection 41b with the second recessed portion 43 for engagement. In the middle of the sliding movement of the second projection 41b, the first peak A of the first projection 41a starts sliding on the inner circumferential surface of the sleeve 26 to engage with the first recessed portion 42 for engagement. Accordingly, the sleeve 26 is brought into the neutral state N to disconnect the second shift stage operating in the second gear ratio established by the second clutch ring 24 and the second output gear 28b.

When the sleeve 26 is required to be held in the neutral state N, the operation of the shaft drive device 27 may be terminated. Because the biasing force F1, which is the total of the biasing force F2 and the biasing force F3 (i.e., F1=F2 +F3), applied by the first and second projections 41a and 41b biases against the sleeve 26 in the radially outward direction, the sleeve 26 may not be contacted with the first clutch ring 23 by being displaced from the neutral position, that is, the neutral state N. At this time, the first and second straight line portions 41a1 and 41a2 of the first projection 41a come into contact with and engage with the first and second corner portions 42a and 42b of the first recessed portion 42 for engagement while the third and fourth straight line portions 41b1 and 41b2 of the second projection 41b come into contact with and engage with the third and fourth corner portions 43a and 43b of the second recessed portion 43 for engagement. As such, the sleeve 26 engages with the first and second projections 41a and 41b by a high surface pressure. Accordingly, the sleeve 26 is restricted from moving in the axial direction and engages with the clutch hub 25 stably.

Next, the sleeve 26 moves into the first shift state S1. The shaft drive device 27 drives the sleeve 26 to pass through the neutral position, that is, the neutral state N, and to shift to the right. Accordingly, the first and second peaks A and B of the respective first and second projections 41a and 41b slide on the inner circumferential surface of the sleeve 26 to engage the first projection 41a with the second recessed portion 43 for engagement while the second projection 41b comes to be detached completely from the inner circumferential surface of the sleeve 26. Because the first and second straight line portions 41a1 and 41a2 of the first projection 41a come into contact with, and engage with the third and fourth corner portions 43a and 43b of the second recessed portion 43 for engagement, respectively, the sleeve 26 engages with the first projection 41a by a high surface pressure stably.

As is apparent from the aforementioned explanation, according to the first embodiment, the elastic member 41 for restricting the position, or attitude of the sleeve 26 is positioned between the sleeve 26 and the clutch hub 25. The relative positions of the sleeve 26 and the clutch hub 25 are determined in accordance with the tolerances of the small number of the members, which are the sleeve 26, the clutch hub 25, and the elastic member 41. Accordingly, the positioning of the sleeve 26 in the axial direction, particularly in the neutral state N, may be precisely established. If the sleeve 26 is not stably positioned in the neutral state N, it may come into contact with the first and second dog clutch portions 23a and 24a. Because the sleeve 26 is restricted from coming into contact with the first and second dog clutch portions 23a and 24a, the distances between the sleeve 26 and the respective first and second dog clutch portions 23a and 24a may be shortened. Accordingly, the size of the shift device 10 may be reduced by reducing the length in the axial direction. Further, when the sleeve 26 is in operation, the time for the sleeve 26 to mesh with the respective first and second dog clutch portions 23a and 24a may be reduced, contributing to the enhancement of the transmission performance of the transmission. By engaging the two portions, the first and second projections 41a and 41b, of the elastic member 41 with the respective two portions, the first and second recessed portions 42 and 43 for engagement, facing the elastic member 41, the neutral state N, the first shift state S1, and second shift state S2 are established. Comparing to the known shift device in which the three recessed portions, serving as the engaged portions, are positioned in a row in the axial direction to establish the neutral state N, the first shift state S1, and second shift state S2, the size of the shift device 10 may be reduced by reducing the length in the axial direction of the shift device 10. Further, because the two portions, the first and second projections 41a and 41b, of the elastic member 41 bias against the sleeve 26 simultaneously in the neutral state N, the sleeve 26 may be maintained at the neutral state N favorably. That is the shift device 10 may include the holding mechanism at the dog clutch mechanism which does not include the synchronizer ring.

According to the first embodiment, the elastic member 41, formed by bending the opposing end portions of the rectangular plate-shaped member to include the first and second projections 41a and 41b, is fixed at the outer circumferential surface of the clutch hub 25 using the bolt 45. That is, even though the clutch hub 25 rotates about the rotary shaft 19, the elastic member 41 is not pulled in the radially outward direction of the clutch hub 25 due to the effect of centrifugal force. Thus, the biasing force applied by the elastic member 41 biasing against the sleeve 26 is not be changed, or varied, resulting in that the shift device 10 may be operated stably.

According to the first embodiment, the first and second recessed portions 42 and 43 for engagement are a pair of the recessed portions for engagement formed and recessed to be spaced from one another and include the first and second facing surfaces 42c and 42d and the third and fourth facing surfaces 43c and 43d, respectively, positioned orthogonal to the axis and facing one another. Accordingly, the first projection 41a of the elastic member 41 is sandwiched by, and engaged with the first and second facing surfaces 42c and 42d of the first recessed portion 42 for engagement while the second projection 41b of the elastic member 41 is sandwiched by, and engaged with the third and fourth facing surfaces 43c and 43d of the second recessed portion 43 for engagement. Thus, the movement of the sleeve 26 in the axial direction is restricted favorably.

Next, a second embodiment of the disclosure will be explained referring to FIGS. 8 to 10. The shape of the engaged portions in the second embodiment is different from that of the first embodiment. According to the second embodiment, a projection 51 for engagement is included to engage the first and second projections 41a and 41b of the elastic member 41. Other than the projection 51 for engagement, the construction of the shift device 10 in the second embodiment is the same as that of the first embodiment. Thus, the difference in the construction between the first and second embodiments will be explained while the descriptions for the same construction will not be explained.

Figure 8:
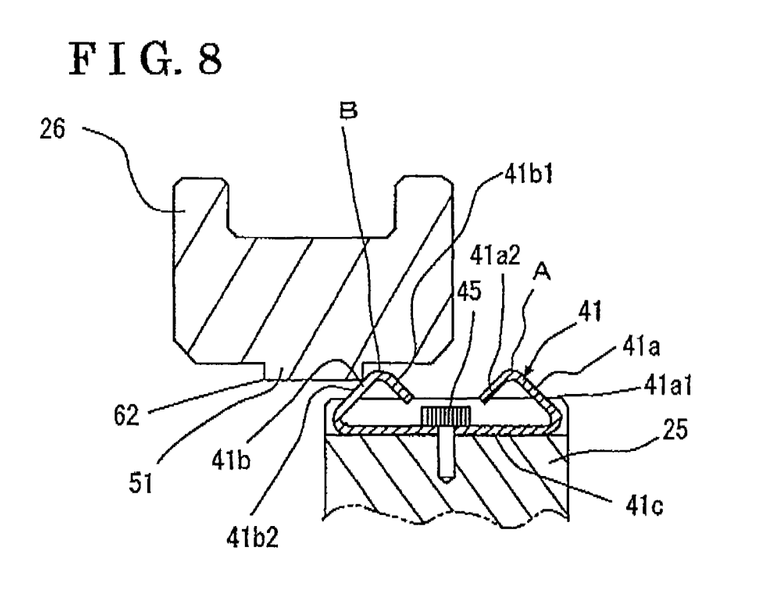
FIG. 8 is a cross sectional view of a sleeve holding mechanism in the second shift state according to a second embodiment.
Figure 9:
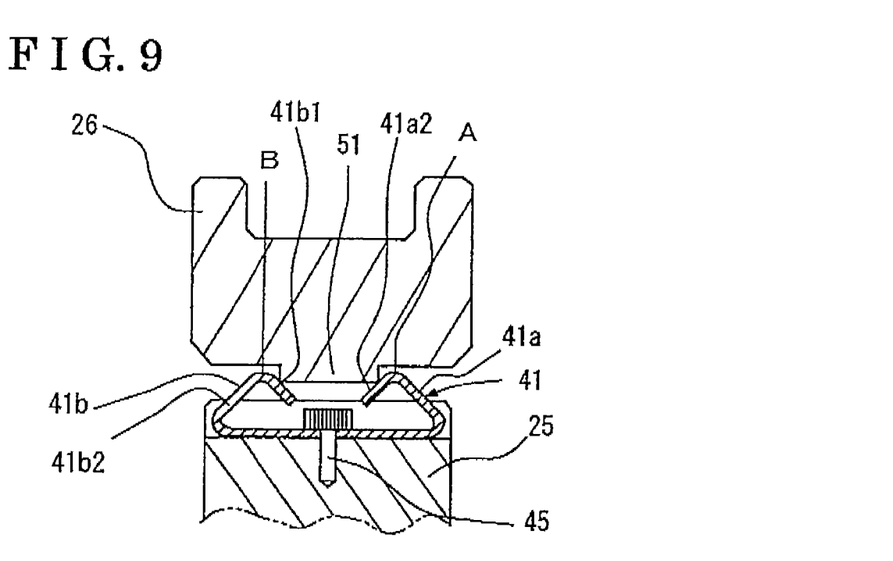
FIG. 9 is a cross sectional view of the sleeve holding mechanism in the neutral state according to the second embodiment.
Figure 10:
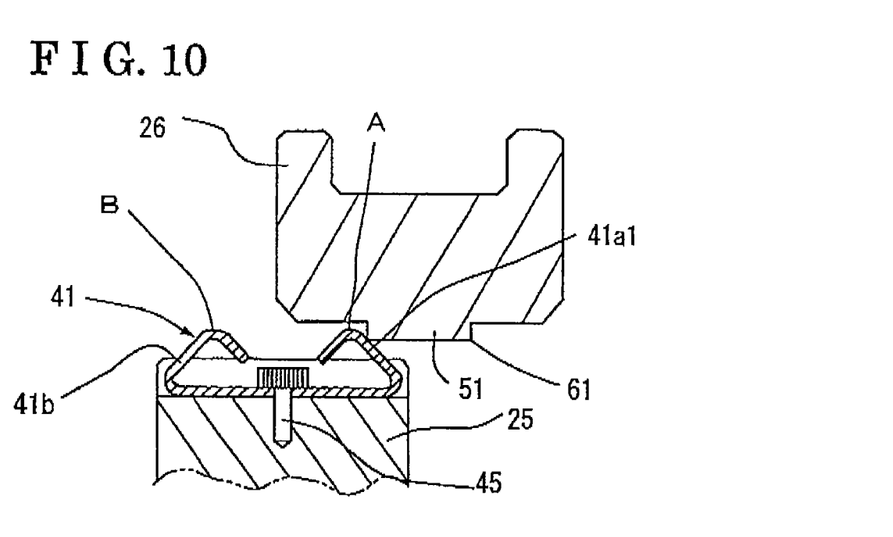
FIG. 10 is a cross sectional view of the sleeve holding mechanism in the first shift state according to the second embodiment.

As illustrated in FIGS. 8 to 10, the projection 51 for engagement is a projection projecting from the inner circumferential surface of the sleeve 26. A first end 61 serving as the first engaged portion of the projection 51 for engagement includes the first engaged portion while a second end 62 serving as the second engaged portion of the projection 51 for engagement includes the second engaged portion. As illustrated in FIG. 9, in the neutral state N, the second straight line portion 41a2 of the first and second straight line portions 41a1 and 41a2 of the first projection 41a of the elastic member 41 is in contact with and engages with the first end 61, which is a corner portion of the projection 51 for engagement while the third straight line portion 41b1 of the third and fourth straight line portions 41b1 and 41b2 of the second projection 41b of the elastic member 41 is in contact with and engages with the second end 62, which is the corner portion of the projection 51 for engagement. Thus, the movement of the sleeve 26 in the axial direction is restricted favorably.

As illustrated in FIG. 10, in the first shift state S1, the first straight line portion 41a1 of the first projection 41a of the elastic member 41 is in contact with the second end 62, which is the corner portion of the projection 51 for engagement. Thus, the movement of the sleeve 26 in the neutral direction N is restricted favorably in the axial direction of the sleeve 26. As illustrated in FIG. 8, in the second shift state S2, the fourth straight line portion 41b2 of the second projection 41b of the elastic member 41 is in contact with the first end 61, which is the corner portion of the projection 51 for engagement. Thus, the movement of the sleeve 26 in the neutral direction N is restricted favorably in the axial direction of the sleeve 26.

As is apparent from the aforementioned explanation, according to the second embodiment, the projection 51 for engagement projecting from the inner circumferential surface of the sleeve 26 include the first end 61 including the first engaged portion and the second end 62 including the second engaged portion. Despite a simple configuration with low manufacturing cost, the first and second ends 61 and 62 restrict the movement of the sleeve 26 in the axial direction favorably by contacting with the first and second projections 41a and 41b of the elastic member 41 in the neutral state N. In the first and second shift states S1 and S2, the movement of the sleeve 26 in the neutral direction N is also restricted favorably in the axial direction of the sleeve 26.

Next, a first modified example of the first and second embodiments will be explained. According to the first and second embodiments, the elastic member 41 is fixed to the outer circumferential surface of the clutch hub 25 by the bolt 45 screwed to the outer circumferential surface of the clutch hub 25. Alternatively, according to the first modified example illustrated in FIG. 11, a recessed groove 65 is formed and recessed at the outer circumferential surface of the clutch hub 25. The recessed groove 65 is formed in the orthogonal direction to the axis and includes first and second wall portions 65a and 65b and opposing ends in the thickness direction of the clutch hub 25 of the recessed groove 65 are closed by the first and second wall portions 65a and 65b. The recessed groove 65 accommodates and holds the elastic member 41.

Figure 11:
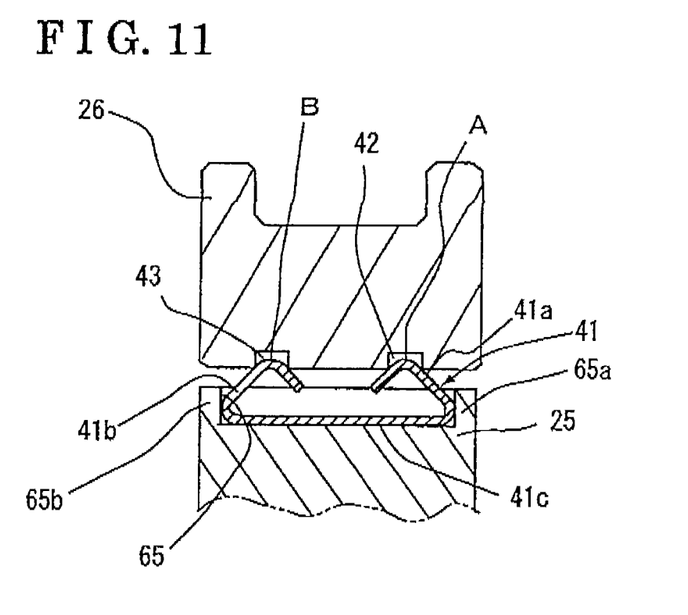
FIG. 11 is a cross sectional view of a sleeve holding mechanism according to a first modified example of the first and second embodiments.

By engaging the sleeve 26 with the outer circumferential surface of the clutch hub 25 while accommodating and holding the elastic member 41 in the recessed groove 65, the elastic member 41 does not detach from the outer circumferential surface of the clutch hub 25 because the recessed groove 65, the first and second wall portions 65a and 65b, and the sleeve 26 serve as stoppers for the elastic member 41. Further, effects and advantages similar to the first and second embodiments may be attained. In addition, the parts cost and the assembling procedure to include the bolt 45 may be reduced.

Figure 12:
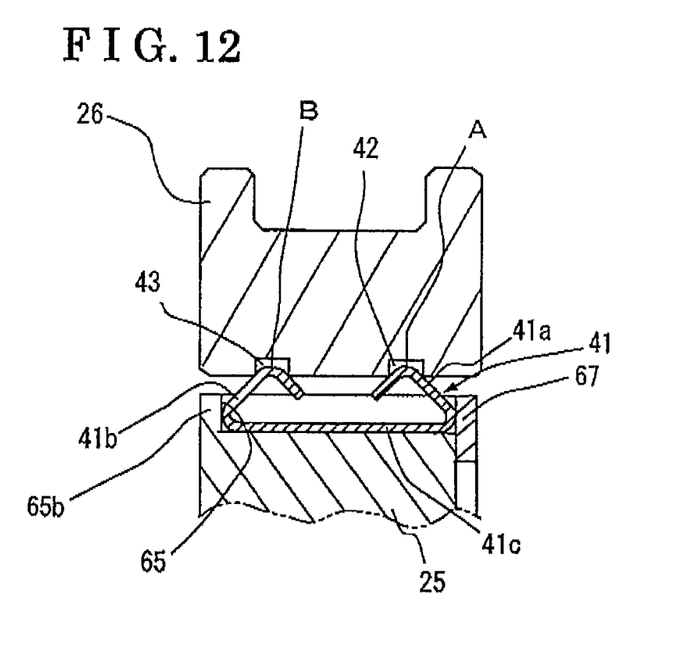
FIG. 12 is a cross sectional view of a sleeve holding mechanism according to a second modified example of the first and second embodiments.

As illustrated in FIG. 12, according to a second modified example of the first and second embodiments, at least one of the first and second wall portions 65a and 65b in the first modified example, the first and second wall portions 65a and 65b closing the opposing ends of the recessed groove 65 may be replaced with a snap ring 67. According to the second modified example, the first wall portion 65a is replaced with the snap ring 67. The snap ring 67 may be engaged into an engagement groove formed at a side surface in the thickness direction of the clutch hub 25. Accordingly, the process for forming the wall portion relative to the recessed groove 65 is not required and thereby contributes to the cost reduction.

According to the first and second embodiments, the elastic member 41 is fixed to the outer circumferential surface of the clutch hub 25 by the bolt 45 screwed to the outer circumferential surface of the clutch hub 26. The inner circumferential surface of the sleeve 26 includes either the first and second recessed portions 42 and 43 for engagement or the projection 51 for engagement. Alternatively, the elastic member 41 may be fixed to the inner circumferential surface of the sleeve 26 by the bolt 45 screwed to the inner circumferential surface of the sleeve 26 while either the first and second recessed portions 42 and 43 for engagement or the projection 51 for engagement may be formed at the outer circumferential surface of the clutch hub 25. Accordingly, effects and advantages similar to the first and second embodiments may be attained.

Figure 13:
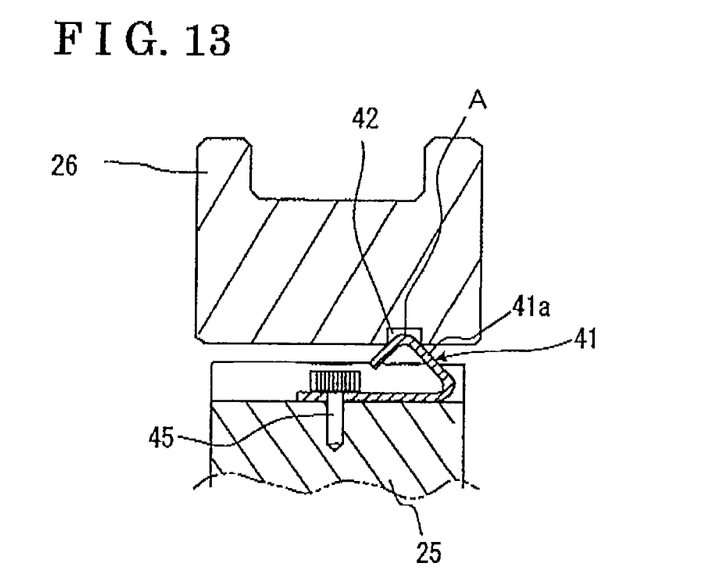
FIG. 13 is a cross sectional view of a sleeve holding mechanism in which an elastic member is divided.

According to the first and second embodiments, the first and second projections 41a and 41b may be formed by a single member, that is, the elastic member 41. Alternatively, the first and second projections 41a and 41b may be divided. Each of the first and second projections 41a and 41b may be located at different positions on the outer circumferential surface of the clutch hub 25. Each of the divided first and second projections 41a and 41b may be fixed to the clutch hub 25 by the bolt 45 screwed to the outer circumferential surface of the clutch hub 25 as illustrated in FIG. 13. While FIG. 13 illustrates only the first projection 41a, the second projection 41b separated from the first projection 41a may be fixed at any other bottom portions using the same method as that of the first projection 41a.

According to the aforementioned embodiments, two of the elastic members 41 are positioned to be spaced apart from one another by substantially 180 degrees in the outer circumferential direction of the clutch hub 25. Alternatively, the elastic member 41 may be only one, or three and more to be positioned. In a case where three or more of the elastic member 41 are to be positioned, the elastic member 41 may favorably be positioned, for example, at regular intervals in the outer circumferential direction of the clutch hub 25 for the sleeve 26 biased by the elastic member 41 in the radially outward direction to be held in a well-balanced manner at the outer circumference of the clutch hub 25.

The shape of the first and second projections 41a and 41b of the elastic member 41 may be any shapes other than the triangular shape.

The application of the shift device 10 is not limited to the aforementioned first and second embodiments. For example, the shift device 10 may be applied to a manual transmission, MT, and a dual clutch transmission, DCT, in which the transmission includes two clutches. Effects and advantages similar to the first and second embodiments may be attained.

According to the aforementioned embodiment, the transmission shift device (shift device 10) includes the rotary shaft 19 rotationally connected to the input shaft 22 of the transmission (automatic transmission 13) and rotatably supported about an axis of the rotary shaft 19, the first clutch ring 23 rotatably supported to the rotary shaft 19 and rotationally connected to the output shaft 28 of the transmission (automatic transmission 13) at a first gear ratio, the second clutch ring 24 rotatably supported to the rotary shaft 19 and rotationally connected to the output shaft 28 of the transmission (automatic transmission 13) at a second gear ratio, the clutch hub 25 being fixed to the rotary shaft 19 between the first clutch ring 23 and the second clutch ring 24, the sleeve 26 being restricted the relative rotation with the clutch hub 25 and movably engaged with the rotary shaft 19 in the axial direction, the first dog clutch portion 23a being projected from the side surface of the first clutch ring 23 to face the sleeve 26 and engageably and disengageably meshing with the sleeve spline (spline 26a) formed at the sleeve 26 in response to the shaft drive of the sleeve 26, the second dog clutch portion 24a being projected from the side surface of the second clutch ring 24 to face the sleeve 26 and engageably and disengageably meshing with the sleeve spline (spline 26a) formed at the sleeve 26 in response to the shaft drive of the sleeve 26, the shaft drive device 27 moving the sleeve 26 in the axial direction, and the elastic member 41 being positioned between the clutch hub 25 and the sleeve 26 and restricting the movement of the sleeve 26 in the axial direction in each of the neutral state N where the sleeve spline (spline 26a) does not mesh with the first dog clutch portion 23a and the second dog clutch portion 24a, of the first shift state S1 where the sleeve spline (spline 26a) meshes with the first dog clutch portion 23a, and of the second shift state S2 where the sleeve spline (spline 26a) meshes with the second dog clutch portion 24a. The elastic member 41 includes the first engaging portion (first projection 41a) and the second engaging portion (second projection 41b) and is fixed at one of the inner circumferential surface of the sleeve 26 and the outer circumferential surface of the clutch hub 25, and the first engaged portion (first recessed portion 42 for engagement, first end 61) and the second engaged portion (second recessed portion 43 for engagement, second end 62) are provided at the other one of the inner circumferential surface of the sleeve 26 and the outer circumferential surface of the clutch hub 25. The first engaging portion (first projection 41a) engages with the first engaged portion (first recessed portion 42 for engagement, first end 61) while the second engaging portion (second projection 41b) engages with the second engaged portion (second recessed portion 43 for engagement, second end 62) in the neutral state N. The first engaging portion (first projection 41a) engages with the second engaged portion (second recessed portion 43 for engagement, second end 62) in the first shift state S1. The second engaging portion (second projection 41b) engages with the first engaged portion (first recessed portion 42 for engagement, first end 61) in the second shift state S2.

According to the aforementioned embodiment, the elastic member 41 for restricting the positioning of the sleeve 26 is positioned between the sleeve 26 and the clutch hub 25. Accordingly, the number of the parts for the holding mechanism of the sleeve 26 is reduced. Further, the neutral state N, the first shift state S1, and second shift state S2 are established by engaging the two portions, the first and second engaging portions (first and second projections 41a and 41b), of the elastic member 41 with the respective two portions, the first engaged portion (first recessed portion 42 for engagement, first end 61) and second engaged portions (second recessed portion 43 for engagement, second end 62), facing the elastic member 41. Accordingly, comparing to the known shift device in which the three recessed portions are positioned in a row in the axial direction to establish the neutral state N, the first shift state S1, and second shift state S2, the transmission shift device (shift device 10) may be simply configured and downsized by shortening the length in the axial direction of the transmission shift device (shift device 10). Further, because the two portions, the first and second engaging portions (first and second projections 41a and 41b), of the elastic member 41 bias against the sleeve 26 simultaneously in the neutral state N, the sleeve 26 may be maintained in the neutral state N favorably.

According to the aforementioned embodiment, the elastic member 41 is made from the plate-shaped member whose opposing end portions are bent. The first and second engaging portions (first and second projections 41a and 41b) correspond to the respective end portions of the bent opposing end portions of the plate-shaped member. The center portion of the plate-shaped member is fixed at the outer circumferential surface of the clutch hub 25 using a bolt 45.

According to the aforementioned embodiment, the elastic member 41 may easily be fixed at the outer circumferential surface of the clutch hub 25 between the first and second engaging portions (first and second projections 41a and 41b) by using the single bolt 45. When the clutch hub 25 rotates about the rotary shaft 19, the elastic member 41 is not pulled in the radially outward direction of the clutch hub 25 due to the effect of centrifugal force. Accordingly, the biasing force applied by the elastic member 41 biasing against the sleeve 26 is not changed, or varied, resulting in that the transmission shift device (shift device 10) may be operated stably.

According to the aforementioned embodiment, the outer circumferential surface of the clutch hub 25 includes the recessed groove 65 formed and recessed in the orthogonal direction to the axis and the opposing ends of the recessed groove 65 are closed. The elastic member 41 is accommodated and held within the recessed groove 65.

According to the aforementioned embodiment, the elastic member 41 is accommodated and held within the recessed groove 65 which is formed and recessed on the outer circumferential surface of the clutch hub 25 in the orthogonal direction to the axis and the opposing ends in the thickness direction of the recessed groove 65 are closed. That is the assembling procedure of the elastic member 41 may be reduced.

According to the aforementioned embodiment, at least one of the opposing ends of the recessed groove 65 is closed using the snap ring 67.

According to the aforementioned embodiment, at least one of the first and second wall portions 65a and 65b of the recessed groove 65 may be replaced with the snap ring 67 which closes the opposing ends in the thickness direction of the recessed groove 65. Accordingly, the process for forming the wall portion being replaced by the snap ring 67 is not required and thereby contributes to the cost reduction.

According to the aforementioned embodiment, the first and second engaged portions correspond to the first recessed portion 42 for engagement and the second recessed portion 43 for engagement for engagement formed and recessed to be spaced apart from one another at the other one of the inner circumferential surface of the sleeve 26 and the outer circumferential surface of the clutch hub 25, and each of the first engaged portion (first recessed portion 42 for engagement) and the second engaged portion (second recessed portion 43 for engagement) includes the first facing surface 42c, 43c and the second facing surface 42d, 43d positioned in the orthogonal direction to the axis and facing one another.

According to the aforementioned embodiment, the first engaging portion (first projection 41a) of the elastic member 41 is sandwiched by, and engaged with the first and second facing surfaces 42c and 42d of the first engaged portion (first recessed portion 42 for engagement) while the second engaging portion (second projection 41b) of the elastic member 41 is sandwiched by, and engaged with the third and fourth facing surfaces 43c and 43d of the second engaged portion (second recessed portion 43 for engagement). Thus, the movement of the sleeve 26 in the axial direction is restricted favorably.

According to the aforementioned embodiment, the transmission shift device (shift device 10) further includes the projection 51 being projected at the other one of the inner circumferential surface of the sleeve 26 and the circumferential surface of the clutch hub 25, in which the first engaged portion corresponds to the first end 61 and the second engaged portion corresponds to the second end 62 of the projection 51.

According to the aforementioned embodiment, the first end 61 includes the first engaged portion while the second end 62 includes the second engaged portion on the inner circumferential surface of the sleeve 26. Accordingly, the transmission shift device (shift device 10) may be simply configured and thereby reduces the manufacturing cost.

According to the aforementioned embodiment, the rotary shaft 19 is rotationally connected to the input shaft 22 while the first and second clutch rings 23 and 24 are rotationally connected to the output shaft 28. Alternatively, the rotary shaft 19 may be rotationally connected to the output shaft 28 while the first and second clutch rings 23 and 24 may be rotationally connected to the input shaft 22.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A transmission shift device, comprising:
a rotary shaft rotationally connected to an input shaft of a transmission and rotatably supported about an axis of the rotary shaft;
a first clutch ring rotatably supported to the rotary shaft and rotationally connected to an output shaft of the transmission at a first gear ratio;
a second clutch ring rotatably supported to the rotary shaft and rotationally connected to the output shaft of the transmission at a second gear ratio;
a clutch hub being fixed to the rotary shaft between the first clutch ring and the second clutch ring;
a sleeve being restricted a relative rotation with the clutch hub and movably engaged with the rotary shaft in the axial direction;
a first dog clutch portion being projected from a side surface of the first clutch ring to face the sleeve and engageably and disengageably meshing with a sleeve spline formed at the sleeve in response to a shaft drive of the sleeve;
a second dog clutch portion being projected from a side surface of the second clutch ring to face the sleeve and engageably and disengageably meshing with the sleeve spline formed at the sleeve in response to the shaft drive of the sleeve;
a shaft drive device moving the sleeve in the axial direction; and
an elastic member being positioned between the clutch hub and the sleeve and restricting a movement of the sleeve in the axial direction in each of a neutral state where the sleeve spline does not mesh with the first dog clutch portion and the second dog clutch portion, of a first shift state where the sleeve spline meshes with the first dog clutch portion, and of a second shift state where the sleeve spline meshes with the second dog clutch portion; wherein
the elastic member includes a first engaging portion and a second engaging portion and is fixed at one of an inner circumferential surface of the sleeve and an outer circumferential surface of the clutch hub, and a first engaged portion and a second engaged portion are provided at the other one of the inner circumferential surface of the sleeve and the outer circumferential surface of the clutch hub;
the first engaging portion engages with the first engaged portion while the second engaging portion engages with the second engaged portion in the neutral state;
the first engaging portion engages with the second engaged portion in the first shift state;
the second engaging portion engages with the first engaged portion in the second shift state, and
the elastic member is made from a plate-shaped member whose opposing end portions are bent, the first engaging portion and the second engaging portion correspond to respective end portions of the bent opposing end portions of the plate-shaped member and a center portion of the plate-shaped member is fixed at the outer circumferential surface of the clutch hub using a bolt.

2. The transmission shift device according to claim 1, wherein the outer circumferential surface of the clutch hub includes a recessed groove formed and recessed in an orthogonal direction to the axis and opposing ends of the recessed groove are closed, and the elastic member is accommodated and held within the recessed groove.

3. The transmission shift device according to claim 2, wherein at least one of the opposing ends of the recessed groove is closed using a snap ring.

4. The transmission shift device according to claim 3, wherein the first engaged portion and the second engaged portion correspond to first and second recessed portions for engagement formed and recessed to be spaced apart from one another at said the other one of the inner circumferential surface of the sleeve and the outer circumferential surface of the clutch hub, and each of the first engaged portion and the second engaged portion includes a first facing surface and a second facing surface positioned in an orthogonal direction to the axis and facing one another.

5. The transmission shift device according to claim 3, further comprising:
a projection being projected at said the other one of the inner circumferential surface of the sleeve and the circumferential surface of the clutch hub, wherein the first engaged portion corresponds to a first end of the projection and the second engaged portion corresponds to a second end of the projection.

6. The transmission shift device according to claim 2, wherein the first engaged portion and the second engaged portion correspond to first and second recessed portions for engagement formed and recessed to be spaced apart from one another at said the other one of the inner circumferential surface of the sleeve and the outer circumferential surface of the clutch hub, and each of the first engaged portion and the second engaged portion includes a first facing surface and a second facing surface positioned in an orthogonal direction to the axis and facing one another.

7. The transmission shift device according to claim 2, further comprising:
a projection being projected at said the other one of the inner circumferential surface of the sleeve and the circumferential surface of the clutch hub, wherein the first engaged portion corresponds to a first end of the projection and the second engaged portion corresponds to a second end of the projection.

8. The transmission shift device according to claim 1, wherein the first engaged portion and the second engaged portion correspond to first and second recessed portions for engagement formed and recessed to be spaced apart from one another at said the other one of the inner circumferential surface of the sleeve and the outer circumferential surface of the clutch hub, and each of the first engaged portion and the second engaged portion includes a first facing surface and a second facing surface positioned in an orthogonal direction to the axis and facing one another.

9. The transmission shift device according to claim 1, further comprising:
a projection being projected at said the other one of the inner circumferential surface of the sleeve and the outer circumferential surface of the clutch hub, wherein the first engaged portion corresponds to a first end of the projection and the second engaged portion corresponds to a second end of the projection.

10. A transmission shift device, comprising:
a rotary shaft rotationally connected to an output shaft of a transmission and rotatably supported about an axis of the rotary shaft;
a first clutch ring rotatably supported to the rotary shaft and rotationally connected to an input shaft of the transmission at a first gear ratio;
a second clutch ring rotatably supported to the rotary shaft and rotationally connected to the input shaft of the transmission at a second gear ratio;
a clutch hub being fixed to the rotary shaft between the first clutch ring and the second clutch ring;
a sleeve being restricted a relative rotation with the clutch hub and movably engaged with the rotary shaft in the axial direction;
a first dog clutch portion being projected from a side surface of the first clutch ring to face the sleeve and engageably and disengageably meshing with a sleeve spline formed at the sleeve in response to a shaft drive of the sleeve;
a second dog clutch portion being projected from a side surface of the second clutch ring to face the sleeve and engageably and disengageably meshing with the sleeve spline formed at the sleeve in response to the shaft drive of the sleeve;
a shaft drive device moving the sleeve in the axial direction; and
an elastic member being positioned between the clutch hub and the sleeve and restricting a movement of the sleeve in the axial direction in each of a neutral state where the sleeve spline does not mesh with the first dog clutch portion and the second dog clutch portion, of a first shift state where the sleeve spline meshes with the first dog clutch portion, and of a second shift state where the sleeve spline meshes with the second dog clutch portion;
wherein
the elastic member includes a first engaging portion and a second engaging portion and is fixed at one of an inner circumferential surface of the sleeve and an outer circumferential surface of the clutch hub, and a first engaged portion and a second engaged portion are provided at the other one of the inner circumferential surface of the sleeve and the outer circumferential surface of the clutch hub;
the first engaging portion engages with the first engaged portion while the second engaging portion engages with the second engaged portion in the neutral state;
the first engaging portion engages with the second engaged portion in the first shift state;
the second engaging portion engages with the first engaged portion in the second shift state; and
the elastic member is made from a plate-shaped member whose opposing end portions are bent, the first engaging portion and the second engaging portion correspond to respective end portions of the bent opposing end portions of the plate-shaped member and a center portion of the plate-shaped member is fixed at the outer circumferential surface of the clutch hub using a bolt.

* * * * *